United States Patent
Chen et al.

(10) Patent No.: US 11,976,783 B2
(45) Date of Patent: May 7, 2024

(54) ELECTRONIC DEVICE AND MOUNTING STRUCTURE THEREOF

(71) Applicant: Wistron NeWeb Corp., Hsinchu (TW)

(72) Inventors: Yan-Da Chen, Hsinchu (TW); Bing-Sheng Hsieh, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 0 days.

(21) Appl. No.: 18/153,718

(22) Filed: Jan. 12, 2023

(65) Prior Publication Data

US 2023/0167945 A1 Jun. 1, 2023

Related U.S. Application Data

(62) Division of application No. 17/003,117, filed on Aug. 26, 2020, now Pat. No. 11,635,166.

(30) Foreign Application Priority Data

Oct. 5, 2019 (TW) ................................. 108136148

(51) Int. Cl.
*F16M 13/00* (2006.01)
*F16M 13/02* (2006.01)
*F21V 11/00* (2015.01)

(52) U.S. Cl.
CPC ............ *F16M 13/022* (2013.01); *F21V 11/00* (2013.01)

(58) Field of Classification Search
CPC .. F16M 13/022; F16M 11/14; F16M 11/2014; F16M 13/02; F16M 11/041; F21V 11/00
See application file for complete search history.

(56) References Cited

U.S. PATENT DOCUMENTS

| | | | |
|---|---|---|---|
| 7,014,154 B2 * | 3/2006 | Jeong | .................... F16M 11/105 248/920 |
| 9,049,284 B2 | 6/2015 | Sakurai et al. | |
| 10,621,946 B2 * | 4/2020 | Chen | ........................ A61B 5/00 |
| 10,886,078 B2 | 1/2021 | Fu | |
| 2012/0175476 A1 * | 7/2012 | Lau | ..................... F16M 11/2092 248/218.4 |
| 2013/0299658 A1 * | 11/2013 | Hung | .................. F16M 11/2014 248/276.1 |
| 2015/0182018 A1 * | 7/2015 | Gwag | .................... F16M 11/08 248/447 |
| 2016/0293359 A1 * | 10/2016 | Negri | ....................... B60R 16/02 |

(Continued)

FOREIGN PATENT DOCUMENTS

| | | |
|---|---|---|
| CN | 102469724 B | 10/2015 |
| TW | 201106311 A | 2/2011 |

(Continued)

*Primary Examiner* — Amy J. Sterling
(74) *Attorney, Agent, or Firm* — McClure, Qualey & Rodack, LLP

(57) ABSTRACT

A mounting structure for connecting an electronic device to a mounting surface is provided. The mounting structure includes a mounting base, a linkage, and a bracket. The first end of the linkage pivots on the mounting base. The bracket is rotatably connected to the second end of the linkage, wherein the bracket includes a cable receiving groove. The electronic device is disposed on the bracket. The electronic device includes a cable. At least a portion of the cable extends into the cable receiving groove.

9 Claims, 10 Drawing Sheets

(56) References Cited

U.S. PATENT DOCUMENTS

| | | | |
|---|---|---|---|
| 2017/0043101 A1* | 2/2017 | Cole | A61M 25/0631 |
| 2020/0013569 A1* | 1/2020 | I | H01H 23/16 |
| 2020/0218139 A1* | 7/2020 | Tiefenbrunn | F16B 2/12 |
| 2020/0335292 A1* | 10/2020 | Lai | H01H 23/02 |
| 2023/0142316 A1* | 5/2023 | Al-Shamsie | A61B 5/15144 |
| | | | 422/410 |

FOREIGN PATENT DOCUMENTS

| | | |
|---|---|---|
| TW | M531087 U | 10/2016 |
| TW | M416918 U | 1/2019 |
| TW | M573121 U | 1/2019 |

\* cited by examiner

ELECTRONIC DEVICE AND MOUNTING STRUCTURE THEREOF

CROSS REFERENCE TO RELATED APPLICATIONS

This application is a Divisional of pending U.S. patent application Ser. No. 17/003,117, filed Aug. 26, 2020 and entitled "Electronic device and mounting structure thereof" (now U.S. Pat. No. 11,635,166, issued on Apr. 25, 2023), which claims priority of Taiwan Patent Application No. 108136148, filed on Oct. 5, 2019, the entirety of which is incorporated by reference herein.

BACKGROUND OF THE INVENTION

Field of the Invention

The present invention relates to a mounting structure, and in particular to a mounting structure adapted to modify the mounting position of an electronic device.

Description of the Related Art

Conventional customer premises equipment (CPE) is equipment, such as a modem, broadband router or broadband gateway, located on the customer's premises that connects the user to the Internet. Conventionally, customer premises equipment is connected to the network cable, and there is no orientation request of the conventional customer premises equipment. However, with the development of 5G technology, customer premises equipment with 5G transmission function has emerged. The mounting orientation of the customer premises equipment affects the transmission effect of the 5G signals. Therefore, the mounting structure allowing a user to adjust the orientation of the customer premises equipment is therefore required.

BRIEF SUMMARY OF THE INVENTION

Embodiments of the invention are provided to address the aforementioned difficulty.

In one embodiment, a mounting structure for connecting an electronic device to a mounting surface is provided. The mounting structure includes a mounting base, a linkage and a bracket. The first end of the linkage pivots on the mounting base. The bracket is rotatably connected to the second end of the linkage, wherein the bracket comprises a cable receiving groove. The electronic device is disposed on the bracket. The electronic device comprises a cable. At least a portion of the cable extends into the cable receiving groove.

In one embodiment, the mounting structure further comprises an omnidirectional joint, wherein the omnidirectional joint is disposed on the second end of the linkage, and the bracket is rotated relative to the linkage by the omnidirectional joint.

In one embodiment, the bracket comprises an annular body, a first positioning post, and a second positioning post. The cable receiving groove is formed on the first body side of the annular body. The first positioning post and the second positioning post are disposed on the second body side of the annular body. The first positioning post is affixed to the annular body. The second positioning post is slidably connected to the annular body.

In one embodiment, the bracket comprises a plurality of restriction portions, which correspond to the cable receiving groove. The restriction portions are connected to the annular body. A plurality of openings are formed on the annular body. The openings are communicated to the cable receiving groove. The cable enters the cable receiving groove through one of the openings, extending in the cable receiving groove, restricted by at least one of the restriction portions and extends out of the cable receiving groove through another opening.

In one embodiment, the electronic device comprises a first positioning hole and a second positioning hole. In the first assembled state, the first positioning post corresponds to the first positioning hole and the second positioning post corresponds to the second positioning hole. In the second assembled state, the first positioning post corresponds to the second positioning hole, and the second positioning post corresponds to the first positioning hole.

In one embodiment, the first positioning hole comprises a first major area and two first minor areas, the first minor areas are communicated to the first major area, the second positioning hole comprises a second major area and two second minor areas, the second minor areas are communicated to the second major area, and the first major area and the second major area are on a base line, the first minor areas are symmetrically located on both sides of the base line, and the second minor areas are symmetrically located on both sides of the base line.

In one embodiment, the bracket further comprises a spring and a moveable plate, one end of the spring abuts the annular body, the other end of the spring abuts the moveable plate, the movable plate is connected to the second positioning post, the moveable plate is adapted to push the second positioning post between a first post position and a second post position.

In one embodiment, an electronic device is provided. The electronic device includes a device housing, a button and an elastic element. The device housing comprises a first recess and a second recess. The button is rotatably disposed on the device housing, wherein the button comprises at least a protrusion, and when the button is in a first button orientation, the protrusion is wedged into the first recess, and when the button is in a second button orientation, the protrusion is wedged into the second recess. The elastic element abuts the button, wherein the button is adapted to be moved between a first button position and a second button position, and when the button is in the first button position, the protrusion is adapted to be wedged into the first recess or the second recess, and when the button is in the second button position, the protrusion is separated from the first recess or the second recess, the elastic element tends to move the button from the second button position back to the first button position.

In one embodiment, the electronic device further comprises a light source and a light guiding element, wherein the light source is disposed in the device housing, the light guiding element is disposed between the light source and the button, the button comprises a transparent mark, the light source provides a light, the light travels from the light source, through the light guiding element, and passes the transparent mark to be emitted.

In one embodiment, the electronic device further comprises a shielding plate, wherein the shielding plate is disposed in the device housing, and the shielding plate surrounds the light guiding element.

In one embodiment, the shielding plate is affixed to the device housing, one end of the elastic element abuts the button, and the other end of the elastic element abuts the shielding plate.

In one embodiment, the shielding plate further comprises a restriction wall, the button comprises a restriction rib, the restriction rib corresponds to the restriction wall, and at least a portion of the elastic element is sandwiched between the restriction wall and the restriction rib.

In one embodiment, the shielding plate further comprises a restriction surface, and when the button is in the second button position, the button abuts the restriction surface.

In one embodiment, the light guiding element is affixed to the button, and when the button is rotated between the first button orientation and the second button orientation, the light guiding element is rotated with the button.

In one embodiment, the electronic device further comprises an elastic shielding material, the elastic shielding material surrounds the light source and the shielding plate abuts the elastic shielding material.

In one embodiment, the light guiding element comprises a light receiving surface and a light emitting surface, the light emitting surface corresponds to the button, the light receiving surface comprises a light receiving recess, and the light receiving recess corresponds to the light source.

Utilizing the mounting structure of the embodiment of the invention, the orientation and the position of the electronic device can be easily adjusted. Therefore, the electronic device can provide improved signal transmission. Additionally, the button can be rotatably disposed on the device housing. After the orientation and the position of the electronic device are adjusted, the orientation of the button can be adjusted to improve the appearance of the electronic device.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
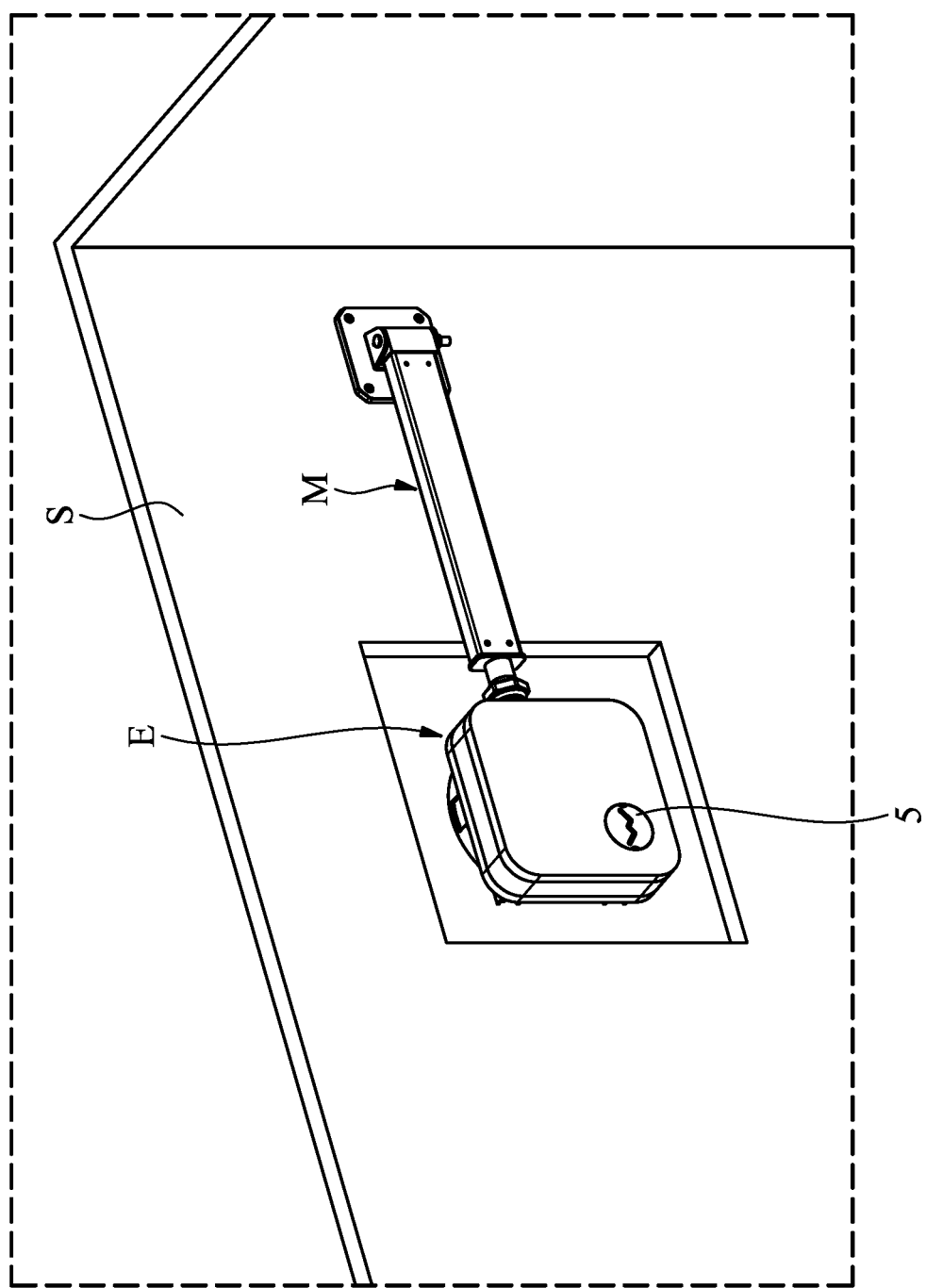
FIGS. 1A and 1B show a mounting structure of an embodiment of the invention.
Figure 1B:
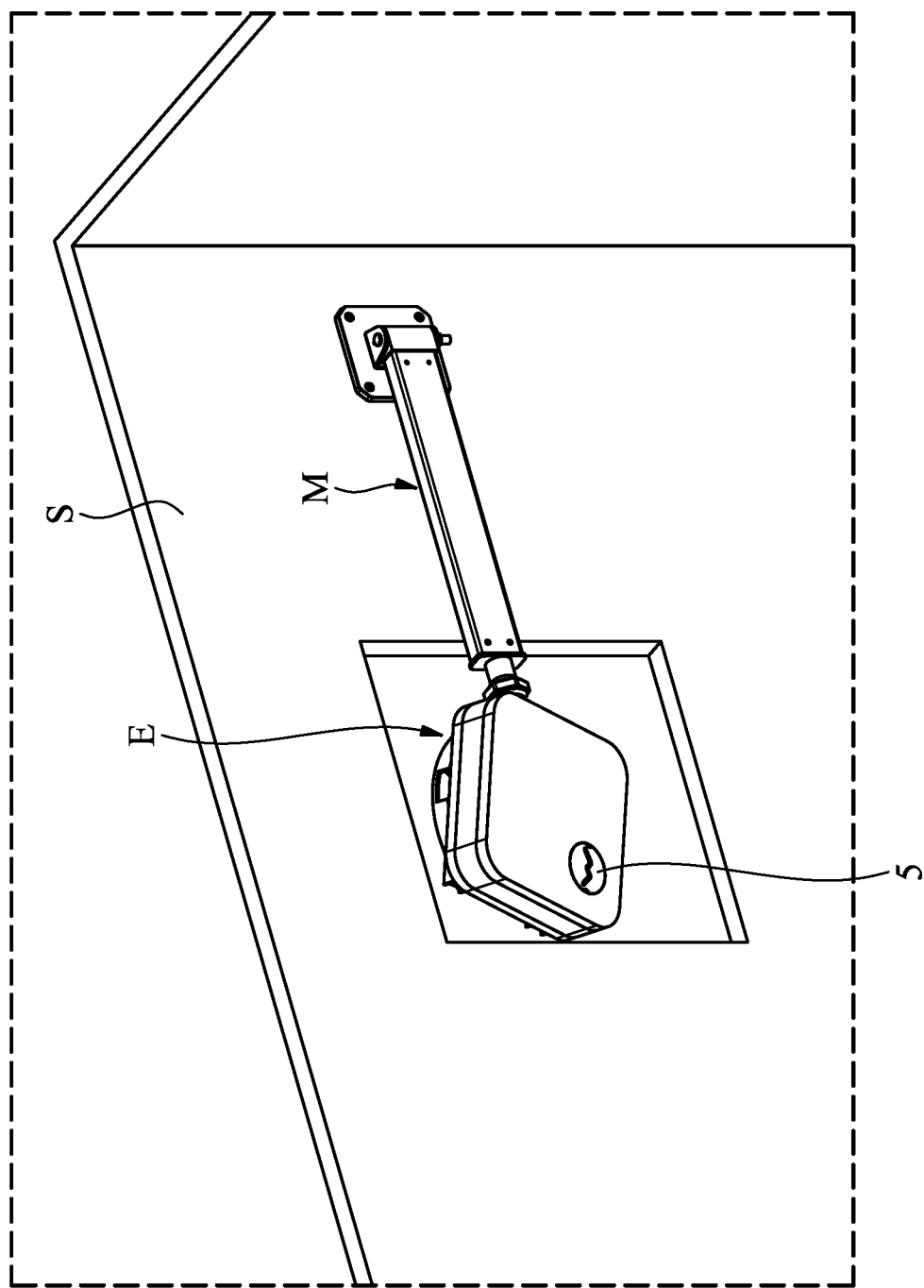

FIGS. 1A and 1B show a mounting structure of an embodiment of the invention, wherein the mounting structure is disposed on a mounting surface. With reference to FIGS. 1A and 1B, the mounting structure M of the embodiment of the invention is for connecting an electronic device E to a mounting surface S. Utilizing the mounting structure M of the embodiment of the invention, the mounting orientation of the electronic device E can be modified easily.

Figure 2:
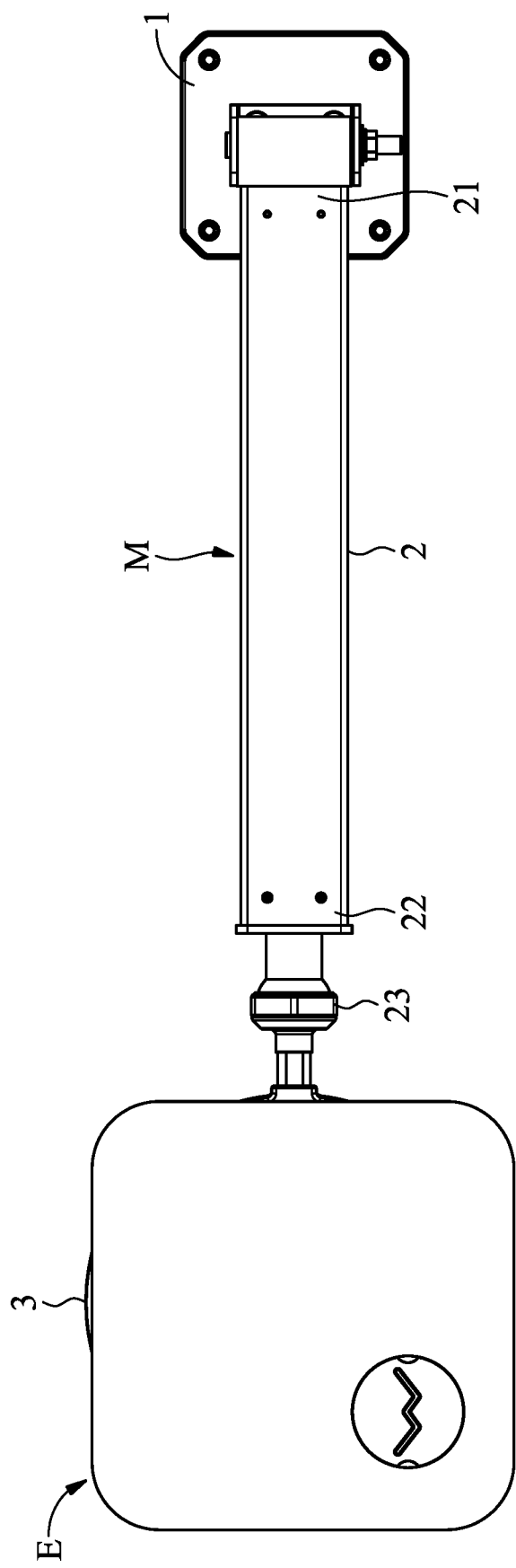
FIG. 2 shows the structure of the mounting structure of the embodiment of the invention.

FIG. 2 shows the structure of the mounting structure M of the embodiment of the invention. With reference to FIG. 2, the mounting structure M includes a mounting base 1, a linkage 2 and a bracket 3. A first end 21 of the linkage 2 pivots on the mounting base 1. The bracket 3 is rotatably connected to the second end 22 of the linkage 2. The bracket 3 comprises a cable receiving groove 31 (with reference to FIGS. 4A and 4B). The electronic device E is disposed on the bracket 3. The electronic device E comprises a cable C, and at least a portion of the cable C extends into the cable receiving groove 31 (with reference to FIGS. 4A and 4B).

With reference to FIG. 2, in one embodiment, the mounting structure M further comprises an omnidirectional joint 23. The omnidirectional joint 23 is disposed on the second end 22 of the linkage 2, and the bracket 3 is rotated relative to the linkage 2 by the omnidirectional joint 23. In one embodiment, the omnidirectional joint 23 can be a ball joint.

Figure 3A:
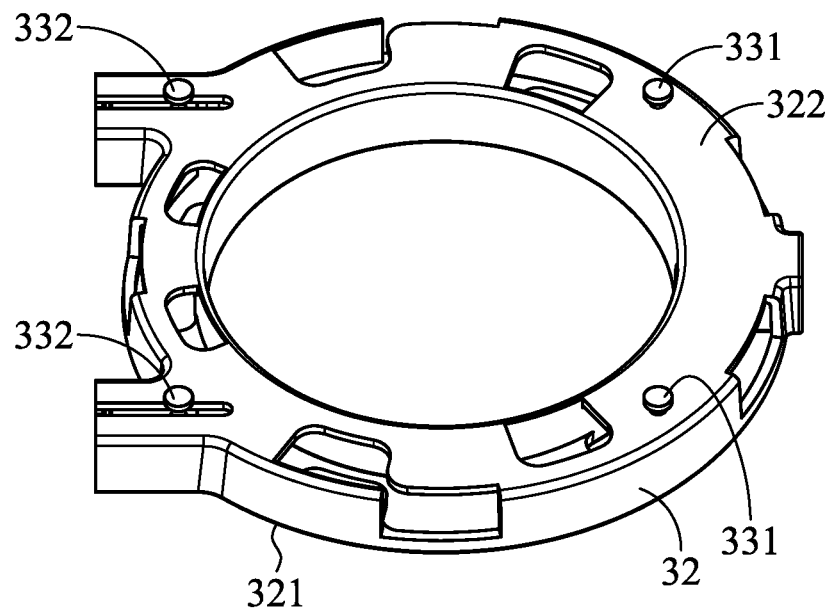
FIG. 3A shows the details of the bracket of the embodiment of the invention.
Figure 3B:
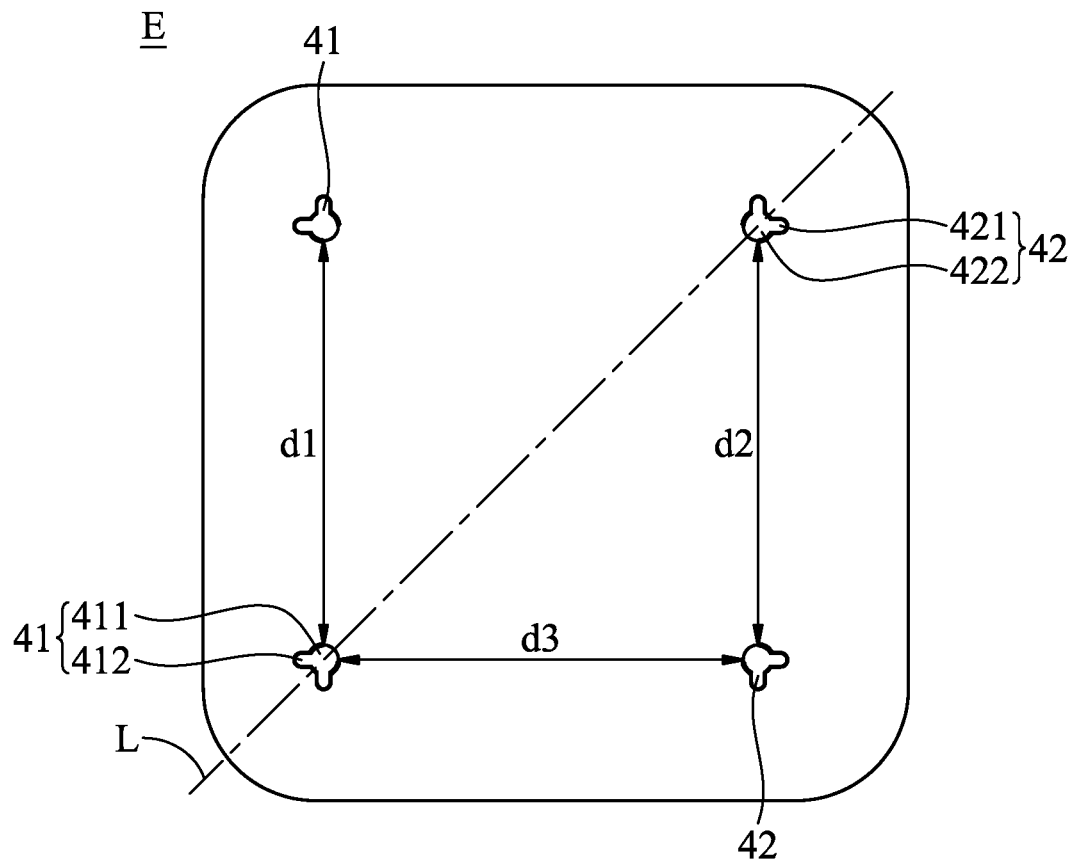
FIG. 3B shows the outer structure of the electronic device of the embodiment of the invention.

FIG. 3A shows the details of the bracket 3 of the embodiment of the invention. FIG. 3B shows the outer structure of the electronic device E of the embodiment of the invention. With reference to FIGS. 3A and 3B, in one embodiment, the bracket 3 comprises an annular body 32, a first positioning post 331 and a second positioning post 332. The cable receiving groove 31 is formed on the first body side 321 of the annular body 32. The first positioning post 331 and the second positioning post 332 are disposed on the second body side 322 of the annular body 32. The first positioning post 331 is affixed to the annular body 32. The second positioning post 332 is slidably connected to the annular body 32.

With reference to FIGS. 3A and 3B, in one embodiment, the electronic device E comprises a first positioning hole 41 and a second positioning hole 42. In the first assembled state, the first positioning post 331 corresponds to the first positioning hole 41, and the second positioning post 332 corresponds to the second positioning hole 42. In the second assembled state, the first positioning post 331 corresponds to the second positioning hole 42, and the second positioning post 332 corresponds to the first positioning hole 41. In other words, the electronic device E can be combined with the bracket 3 in the orientations of 0°, 90°, 180°, or 270° relative to the bracket 3. In this embodiment, the distance d1 between the two first positioning holes 41 equals the distance d2 between the two second positioning holes 42, and also equals the distance d3 between the neighboring first positioning hole 41 and second positioning hole 42. Therefore, the electronic device E can be combined with the bracket 3 in the orientations of 0°, 90°, 180°, or 270° relative to the bracket 3.

With reference to FIG. 3B, in one embodiment, the first positioning hole 41 comprises a first major area 411 and two first minor areas 412. The first minor areas 412 are communicated to the first major area 411. The second positioning hole 42 comprises a second major area 421 and two second minor areas 422. The second minor areas 422 are communicated to the second major area 421. The first major area and the second major area are on a base line L. The first minor areas 412 are symmetrically located on both sides of the base line L, and the second minor areas 422 are symmetrically located on both sides of the base line L.

Figure 3C:
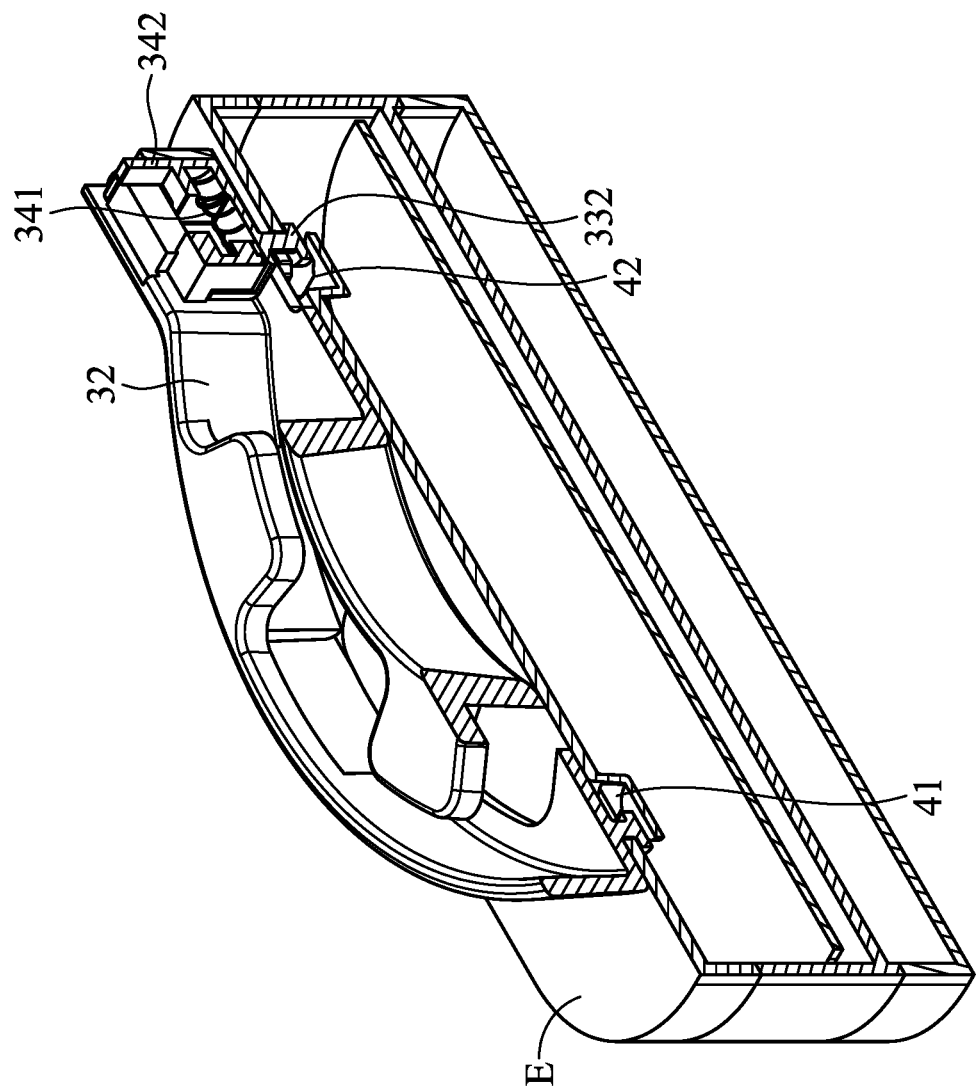
FIG. 3C is cross-sectional views of the bracket of the embodiment of the invention, wherein the second positioning post is in the first post position.
Figure 3D:
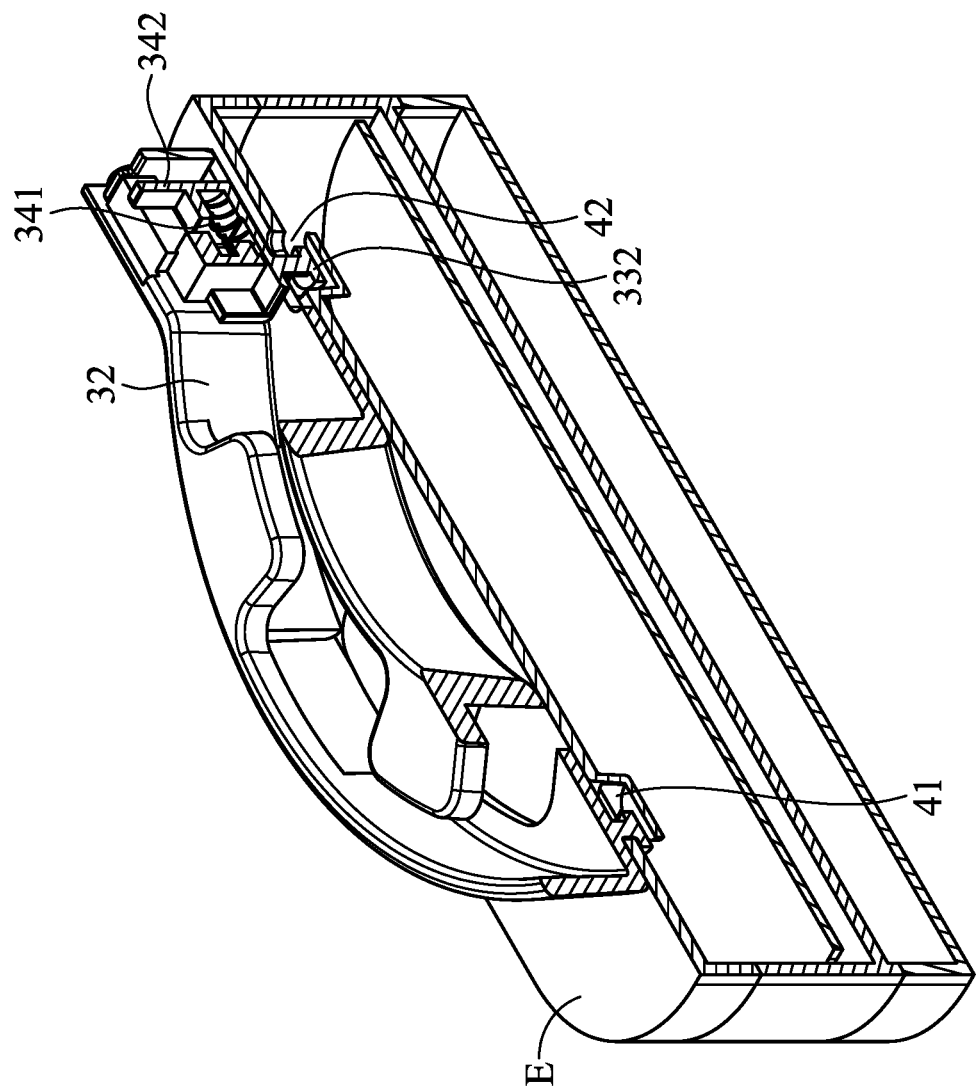
FIG. 3D is cross-sectional views of the bracket of the embodiment of the invention, wherein the second positioning post is in the second post position.

FIGS. 3C and 3D are cross-sectional views of the bracket of the embodiment of the invention. With reference to FIGS. 2, 3A and 3C, in one embodiment, the bracket 3 further comprises a spring 341 and a moveable plate 342. One end of the spring 341 abuts the annular body 32. The other end of the spring 341 abuts the moveable plate 342. The movable plate 342 is connected to the second positioning post 332. The moveable plate 341 is adapted to push the second positioning post 332 between a first post position (FIG. 3C) and a second post position (FIG. 3D). In one embodiment, the moveable plate 342 can be integrally formed with the second positioning post 332. When the second positioning post 332 is in the first post position (FIG. 3C), the elastic force provided by the spring 341 keeping the second positioning post 332 in the first post position, and the second positioning post 332 abuts the electronic device E. When the second positioning post 332 is in the second post position (FIG. 3D), the second positioning post 332 is adapted to be separated from the first major area 411 of the first positioning hole 41 or the second major area 421 of the second positioning hole 42.

Figure 4A:
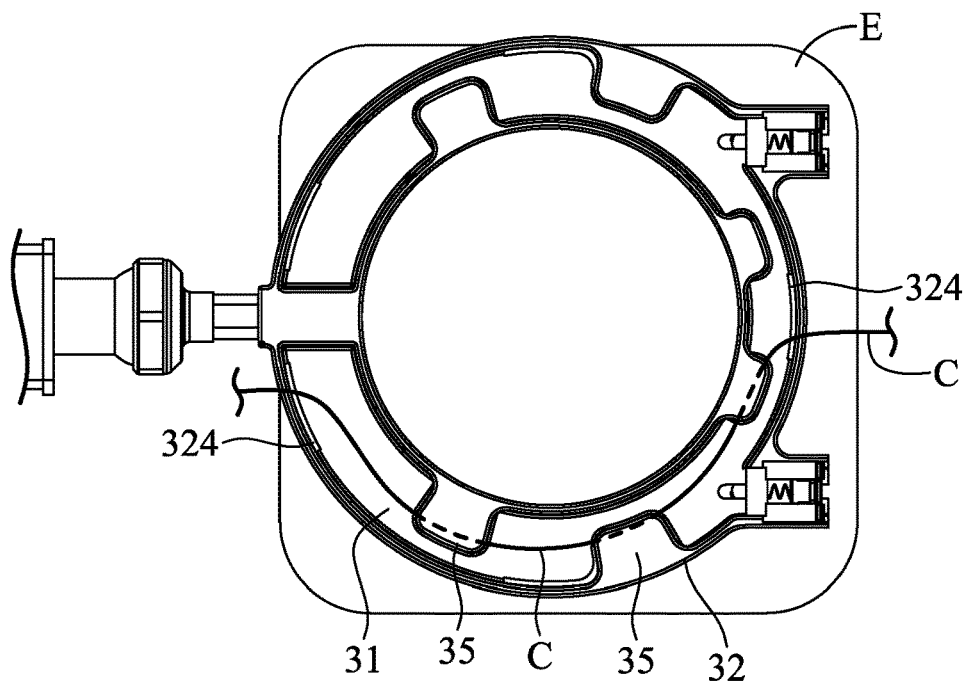
FIGS. 4A and 4B show the arrangement the cable of the embodiment of the invention.
Figure 4B:
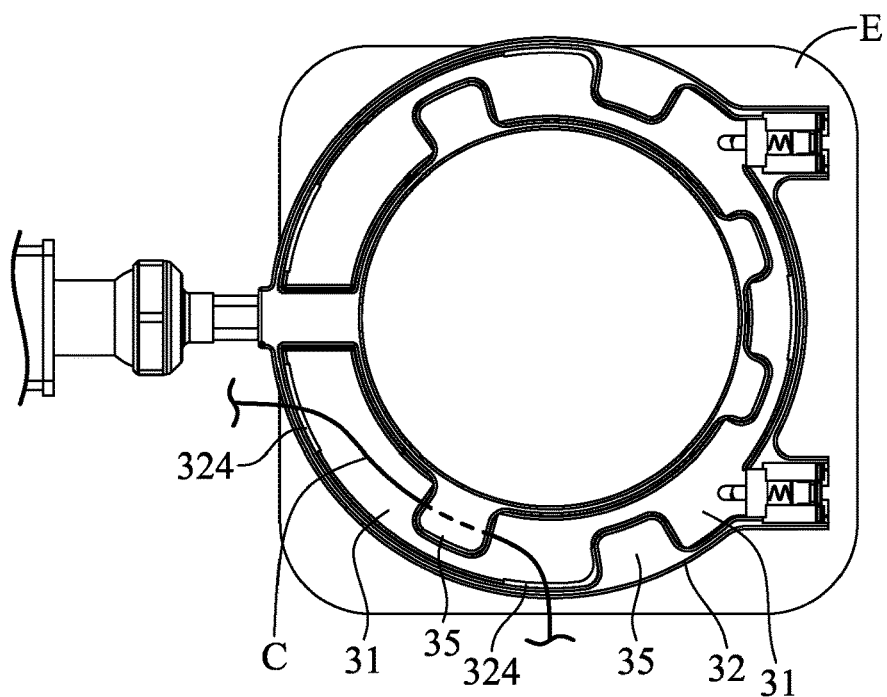

FIGS. 4A and 4B show the arrangement the cable C of the embodiment of the invention. With reference to FIGS. 4A and 4B, in one embodiment, the bracket 3 comprises a plurality of restriction portions 35. The restriction portions 35 correspond to the cable receiving groove 31. The restriction portions 35 are connected to the annular body 32. A plurality of openings 324 are formed on the annular body 32. The openings 324 are communicated to the cable receiving groove 31. The cable C enters the cable receiving groove 31 via one of the openings 324, extending in the cable receiving groove 31, restricted by at least one of the restriction portions 35 and extends out of the cable receiving groove 31 through another opening 324. Utilizing the cable receiving groove 31, the cable C can be neatly arranged. The appearance of the cable C is improved, and the noise interference of the cable C can be reduced.

In one embodiment, the cable C can be the power line of the electronic device E. The cable C can also be other transmission lines.

Figure 5A:
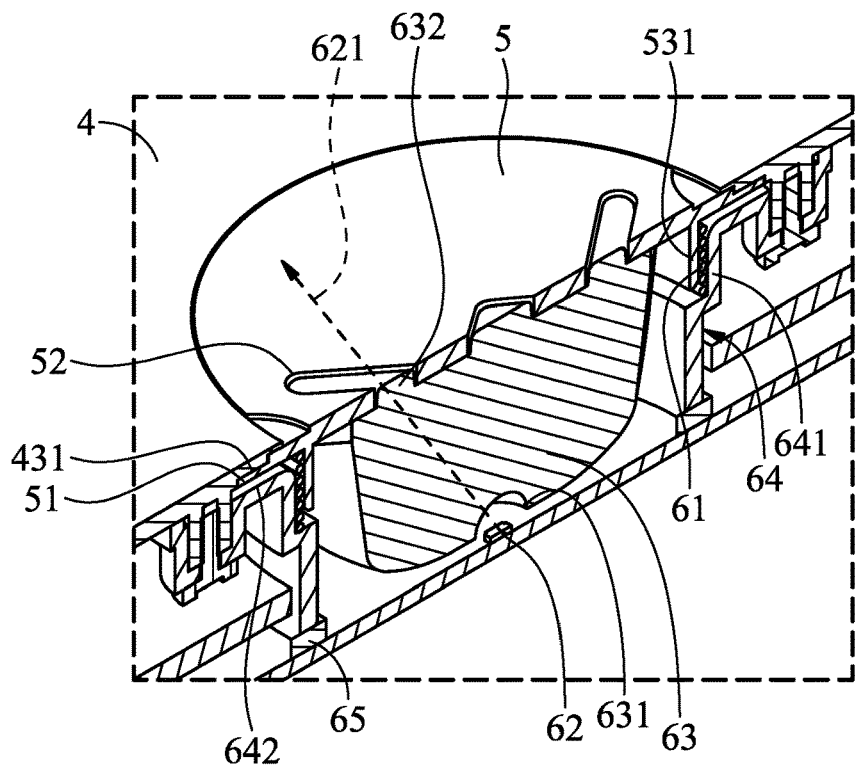
FIGS. 5A and 5B are cross-sectional views of a portion of the structure of the electronic device of the embodiment of the invention.
Figure 5B:
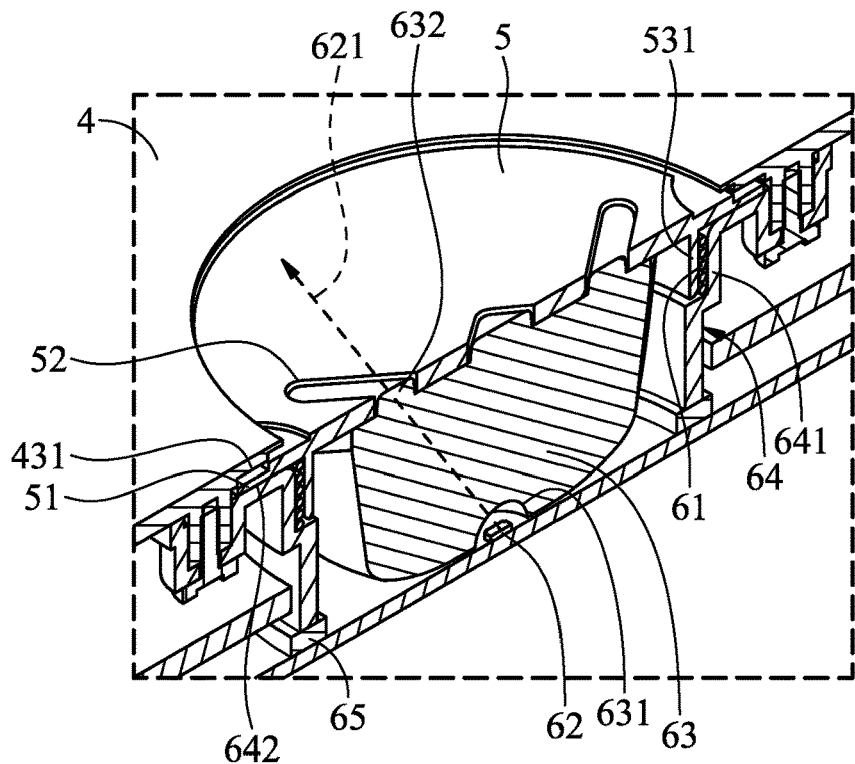
Figure 6A:
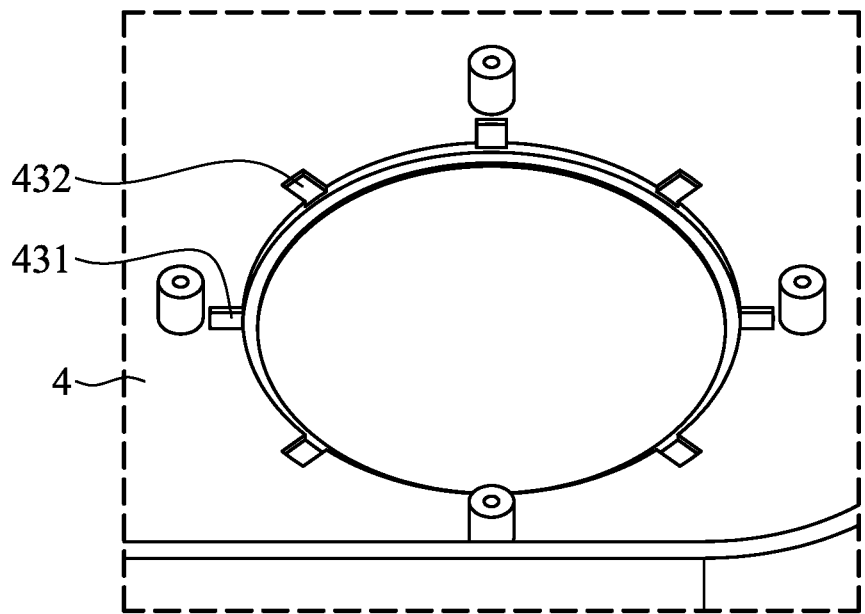
FIG. 6A shows a portion of the device housing of the embodiment of the invention.
Figure 6B:
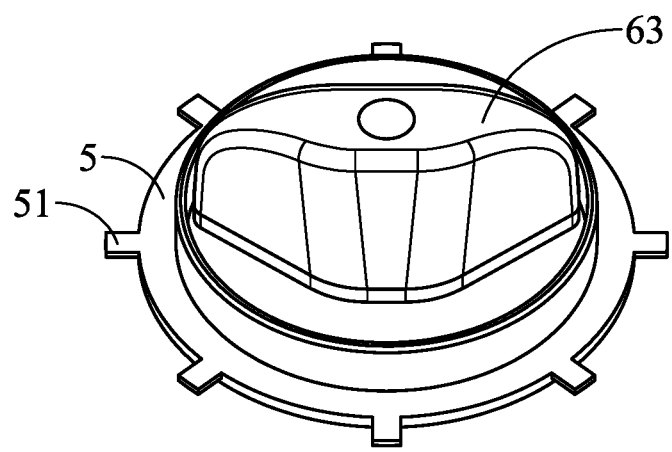
FIG. 6B shows a portion of the button of the embodiment of the invention.
Figure 7A:
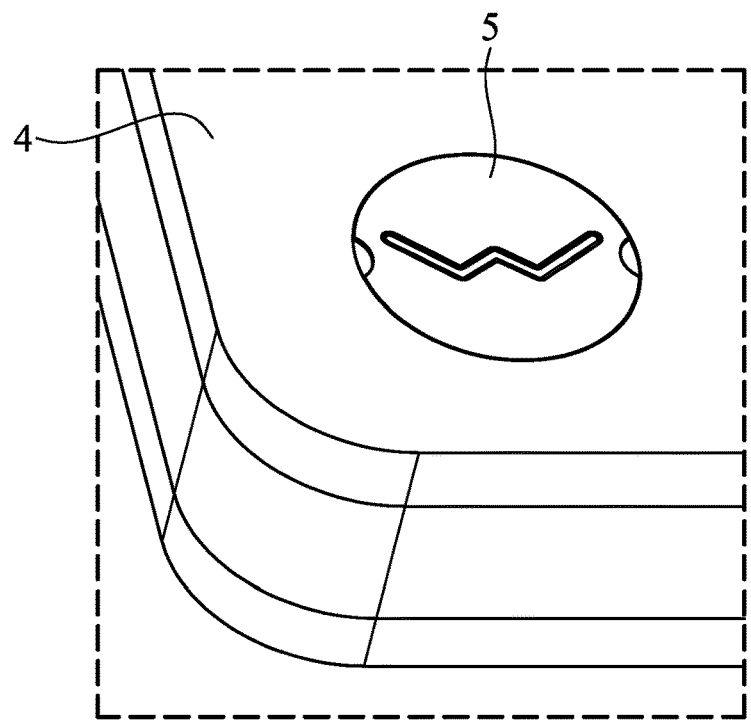
FIG. 7A shows the appearance of the button of the embodiment of the invention, wherein the button is in the first button orientation.
Figure 7B:
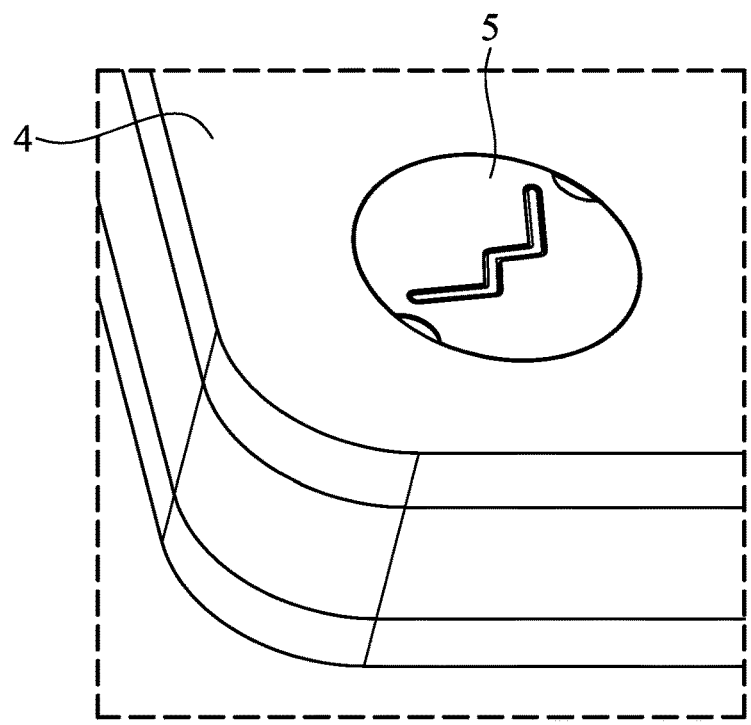
FIG. 7B shows the appearance of the button of the embodiment of the invention, wherein the button is in the second button orientation.

FIGS. 5A and 5B are cross-sectional views of a portion of the structure of the electronic device of the embodiment of the invention. FIG. 6A shows a portion of the device housing of the embodiment of the invention. FIG. 6B shows a portion of the button of the embodiment of the invention. FIGS. 7A and 7B show the appearance of the button of the embodiment of the invention. With reference to FIGS. 5A, 5B, 6A, 6B, 7A and 7B, the electronic device E of the embodiment of the invention includes a device housing 4, a button 5 and an elastic element 61. The device housing 4 comprises a first recess 431 and a second recess 432. The button 5 is rotatably disposed on the device housing 4. The button 5 comprises at least a protrusion 51. When the button 5 is in a first button orientation (FIG. 7A), the protrusion 51 is wedged into the first recess 431. When the button 5 is in a second button orientation (FIG. 7B), the protrusion 51 is wedged into the second recess 432. The elastic element 61 abuts the button 5. The button 5 is adapted to be moved between a first button position (FIG. 5A) and a second button position (FIG. 5B). When the button 5 is in the first button position (FIG. 5A), the protrusion 51 is adapted to be wedged into the first recess 431 or the second recess 432, and the orientation of the button 5 is fastened. When the button 5 is in the second button position (FIG. 5B), the protrusion 51 is separated from the first recess 431 or the second recess 432, the orientation of the button 5 can be modified, the elastic element 6 tends to move the button 5 from the second button position (FIG. 5B) back to the first button position (FIG. 5A).

With reference to FIGS. 5A, 5B and 6B, in one embodiment, the electronic device E further comprises a light source 62 and a light guiding element 63. The light source 62 is disposed in the device housing 4. The light guiding element 63 is disposed between the light source 62 and the button 5. The button 5 comprises a transparent mark 52. The light source 62 provides a light 621. The light 621 travels from the light source 62, through the light guiding element 63, and passes the transparent mark 52 to be emitted.

With reference to FIGS. 5A and 5B, in one embodiment, the electronic device E further comprises a shielding plate 64. The shielding plate 64 is disposed in the device housing 4, and the shielding plate 64 surrounds the light guiding element 63.

With reference to FIGS. 5A and 5B, in one embodiment, the shielding plate 64 is affixed to the device housing 4. One end of the elastic element 61 abuts the button 5, and the other end of the elastic element 61 abuts the shielding plate 64.

With reference to FIGS. 5A and 5B, in one embodiment, the shielding plate 64 further comprises a restriction wall 641. The button 5 comprises a restriction rib 531. The restriction rib 531 corresponds to the restriction wall 641. At least a portion of the elastic element 61 is sandwiched between the restriction wall 641 and the restriction rib 531.

With reference to FIGS. 5A and 5B, in one embodiment, the shielding plate 64 further comprises a restriction surface 642. When the button 5 is in the second button position, the button 5 abuts the restriction surface 642.

With reference to FIGS. 5A and 5B, in one embodiment, the light guiding element 63 is affixed to the button 5. When the button 5 is rotated between the first button orientation and the second button orientation, the light guiding element 63 is rotated with the button 5.

With reference to FIGS. 5A and 5B, in one embodiment, the electronic device further comprises an elastic shielding material 65, the elastic shielding material 65 surrounds the light source 62 and the shielding plate 64 abuts the elastic shielding material 65.

With reference to FIGS. 5A and 5B, in one embodiment, the light guiding element 63 comprises a light receiving surface 631 and a light emitting surface 632. The light emitting surface 631 corresponds to the button 5. The light receiving surface 631 comprises a light receiving recess 633, and the light receiving recess 633 corresponds to the light source.

Utilizing the mounting structure of the embodiment of the invention, the orientation and the position of the electronic device can be easily adjusted. Therefore, the electronic device can provide improved signal transmission. Additionally, the button can be rotatably disposed on the device housing. After the orientation and the position of the electronic device are adjusted, the orientation of the button can be adjusted to improve the appearance of the electronic device.

In one embodiment, the electronic device can be customer premises equipment (CPE), particularly to the CPE utilized to transmit 5G signals. However, the disclosure is not meant to restrict the invention. The electric device can be utilized to transmit signals of other standers, or can be the electric device of other functions.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
a device housing, comprising a first recess and a second recess;
a button, rotatably disposed on the device housing, wherein the button comprises at least a protrusion, and when the button is in a first button orientation, the protrusion is wedged into the first recess, and when the button is in a second button orientation, the protrusion is wedged into the second recess;
an elastic element, abutting the button, wherein the button is adapted to be moved between a first button position and a second button position, and when the button is in the first button position, the protrusion is adapted to be wedged into the first recess or the second recess, and when the button is in the second button position, the protrusion is separated from the first recess or the second recess, the elastic element tends to push the button from the second button position back to the first button position;
a light source; and
a light guiding element, wherein the light source is disposed in the device housing, the light guiding element is disposed between the light source and the button.

2. The electronic device as claimed in claim 1, wherein the button comprises a transparent mark, the light source provides a light, the light travels from the light source, through the light guiding element, and passes the transparent mark to be emitted.

3. The electronic device as claimed in claim 2, further comprising a shielding plate, wherein the shielding plate is disposed in the device housing, and the shielding plate surrounds the light guiding element.

4. The electronic device as claimed in claim 3, wherein the shielding plate is affixed to the device housing, one end of the elastic element abuts the button, and the other end of the elastic element abuts the shielding plate.

5. The electronic device as claimed in claim 4, wherein the shielding plate further comprises a restriction wall, the button comprises a restriction rib, the restriction rib corresponds to the restriction wall, and at least a portion of the elastic element is sandwiched between the restriction wall and the restriction rib.

6. The electronic device as claimed in claim 5, wherein the shielding plate further comprises a restriction surface, and when the button is in the second button position, the button abuts the restriction surface.

7. The electronic device as claimed in claim 6, wherein the light guiding element is affixed to the button, and when the button is rotated between the first button orientation and the second button orientation, the light guiding element is rotated with the button.

8. The electronic device as claimed in claim 7, further comprising an elastic shielding material, the elastic shielding material surrounds the light source and the shielding plate abuts the elastic shielding material.

9. The electronic device as claimed in claim 7, wherein the light guiding element comprises a light receiving surface and a light emitting surface, the light emitting surface corresponds to the button, the light receiving surface comprises a light receiving recess, and the light receiving recess corresponds to the light source.

* * * * *